(No Model.)
P. SCHARBACH.
WHEEL CULTIVATOR.
No. 363,686. Patented May 24, 1887.
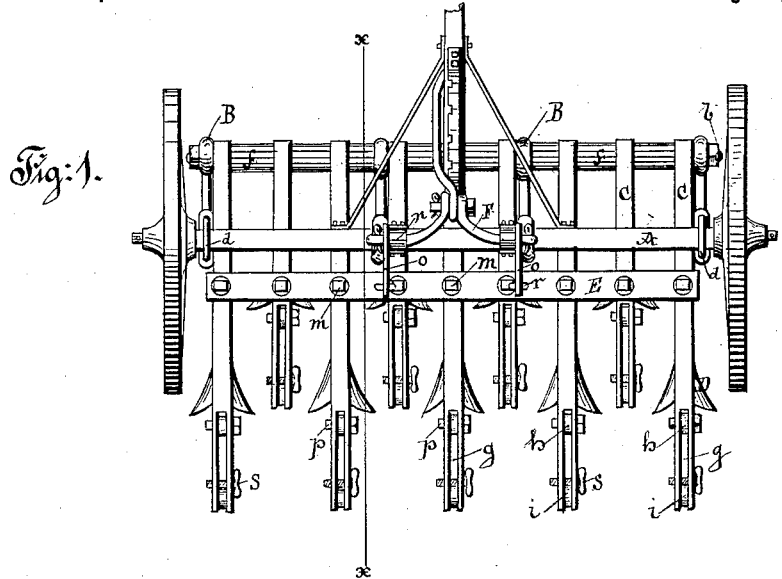
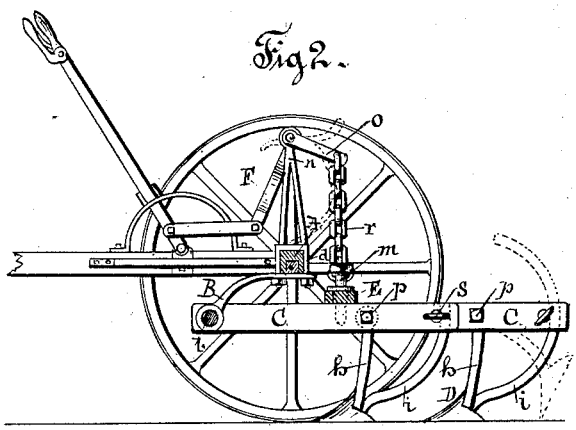
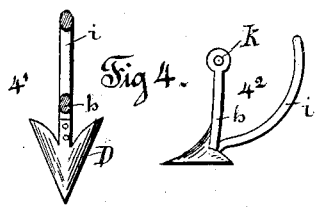
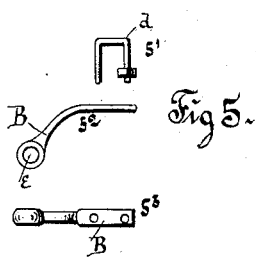
Witnesses:
August Ohlhoff
Leon T. West
Inventor:
Peter Scharbach

UNITED STATES PATENT OFFICE.

PETER SCHARBACH, OF SILVERTON, OREGON.

WHEEL-CULTIVATOR.

SPECIFICATION forming part of Letters Patent No. 363,686, dated May 24, 1887.

Application filed January 17, 1887. Serial No. 224,636. (No model.)

*To all whom it may concern:*

Be it known that I, PETER SCHARBACH, a citizen of the United States, residing at Silverton, county of Marion, and State of Oregon, have invented a new and useful Wheel-Cultivator, of which the following is a specification.

My invention relates to improvements in wheel-cultivators, facilitating the operation and making the construction a more durable one, as no springs or pressure of any kind is needed to press the peculiar movable arrow-shaped hoes or shovels into the soil. The weight of the bars to which the hoes are hung, including the weight of the hoes, is sufficient to have the desired effect, and still each hoe or shovel can do its work independent and overcome unforeseen obstacles in the soil.

In the drawings forming a part of this specification, Figure 1 is a top view of my improved cultivator. Fig. 2 is a section of same on line $x\ x$. Fig. 3 shows the cranked shaft, facilitating the lifting of bars and shovels. Fig. 4 shows the peculiar arrow-shaped plow hoe or shovel with its upright hanger and quarter-circular brace. Of this figure, $4'$ is a top view, and $4^2$ a side view. Fig. 5 shows the independent hangers by which the cultivator is hung to the axle, and to which the bars are hinged. $5'$ shows the axle-clamp. $5^2$ is a side view of the hanger. $5^3$ is a top view of the same.

A is the wheel-frame, wherein the axle is housed.

B are the iron hangers, fastened to the axle-frame A, and to which the bars are hinged by pivot-rod $b$.

C are the short and long bars, to which the adjustable hoes or shovels D are hung.

E is the cross-beam, to which bars C are fastened, holding them properly apart, and allowing them to be raised or lowered by means of crank-shaft F.

The axle is housed into wheel-frame A. Over this frame the independent hangers B are fastened by means of wrought-iron clamps $d$, and screwed to them by nuts. These hangers B are provided at their ends with an eye-hole, $e$, through which the pivot-rod $b$ is placed, and fastened by nuts on the outside of the two outer hangers. To pivot-rod $b$ are also hinged the inner ends of bars C, and kept apart at proper distances by intersected wooden sheaves or cast-iron ferrules $f$.

The bars C consist of long and short ones, placed as per drawings, and may be increased or decreased in number, as per width of cultivator. The bars C have on their outer ends slots $g$, long and wide enough to receive the uprights $h$ of shovels D, and also the quarter-circular braces $i$ of hoes or shovels D. The uprights $h$ of shovels D have an eye-hole, $k$, on their ends, thus allowing them to be hinged to bars C by pivots $p$, and can be placed into any desirable position by quarter-circular brace $i$, with its clamp set-screw $s$, so the hoes D may cut any depth, as per their length, or being dragged on their points, if necessary. By clamp set-screws $s$ the slots $g$ of bars C are tightened sufficiently to keep quarter-circular brace $i$ in any desired position; but they will also allow brace $i$ to move upward, in case hoe or shovel D should strike any obstacle in the soil.

All the bars C are hung and secured to cross-beam E by means of a lag-screw, $m$. These lag-screws $m$ are let into the wood of bars C only, whereas a hole is bored through cross-beam E large enough to allow them to play up and down. A washer placed under the head of lag-screw $m$ will prevent the same from slipping through the hole bored into cross-beam E, and still the washer and head of lag-screw $m$ will be strong enough to raise each bar C when crank-shaft F is applied for this purpose. Crank-shaft F, hanging in braces $n$, is connected with an ordinary hand-lever and ratchet placed on top of the tongue of the cultivator. The shoulders of crank-shaft F are provided with lever-arms $o$, standing at right angle to the crank-shaft F. The ends of the lever-arms $o$ are connected by chains $r$ with cross-beam E, thus allowing the raising and lowering of the cultivator.

The driver's seat may be placed suitably.

What I claim as new is—

1. The combination, with the axle, the hangers supported thereby, and the bars C, pivoted at one end on the shaft $b$, supported by said hangers, of the cross-bar E, connecting said bars C, the lag-screws $m$, secured at one end to said bars C and passed loosely through a hole in the cross-bar, and means for raising said bars, substantially as and for the purpose specified.

2. The combination, with the axle, the hangers B, supported therefrom, and the bars C, carrying the shovels and pivoted at one end on the shaft $b$, supported by said hangers, of the cross-bar E, the lag-screw $m$, loosely connecting said bar C and cross-bar, the crank-shaft F, lever-arms $o$ on said crank-shaft, and the chains $r$, connecting said arms with the cross-bar, substantially as and for the purpose specified.

PETER SCHARBACH.

Witnesses:
AUGUST OHLHOFF,
LEON T. WEST.